United States Patent [19]

Lowenschuss et al.

[11] Patent Number: 5,081,461
[45] Date of Patent: Jan. 14, 1992

[54] CORRELATION DETECTOR FOR FM SIGNALS

[75] Inventors: Oscar Lowenschuss; Bruce E. Gordon, both of Santa Barbara, Calif.

[73] Assignee: Raytheon Company, Lexington, Mass.

[21] Appl. No.: 725,235

[22] Filed: Jun. 26, 1991

Related U.S. Application Data

[63] Continuation of Ser. No. 516,501, Apr. 30, 1990, abandoned.

[51] Int. Cl.⁵ .................................. G01S 7/285
[52] U.S. Cl. ..................... 342/189; 342/200; 342/378
[58] Field of Search ............ 342/122, 200, 196, 128, 342/145, 189, 378, 379, 381, 382, 383, 384

[56] References Cited

U.S. PATENT DOCUMENTS

| | | | |
|---|---|---|---|
| 2,885,590 | 5/1959 | Fuller | 342/378 X |
| 2,896,162 | 7/1959 | Berger et al. | 342/378 X |
| 3,065,465 | 11/1962 | Wimberly | 342/87 |
| 3,167,767 | 1/1965 | Capelli | 342/122 |
| 3,238,499 | 3/1966 | Backus | 342/378 X |
| 3,341,849 | 9/1967 | Cordry et al. | 342/89 |
| 3,427,615 | 2/1969 | Hubka | 342/122 |
| 3,679,983 | 7/1972 | Theriot | 342/174 X |
| 3,899,740 | 8/1975 | Unkauf et al. | 342/394 X |
| 3,938,147 | 2/1976 | Kalmus | 342/68 X |
| 4,044,356 | 8/1977 | Fournier | 342/189 |
| 4,107,679 | 8/1978 | Strauch et al. | 342/87 |
| 4,123,719 | 10/1978 | Hopwood et al. | 342/174 X |
| 4,176,351 | 11/1979 | DeVita et al. | 342/111 |
| 4,321,602 | 3/1982 | Kipp | 342/103 |
| 4,462,032 | 7/1984 | Martin | 342/25 |
| 4,468,667 | 8/1984 | Baylor | 342/379 |
| 4,568,938 | 2/1986 | Ubriaco | 342/87 |
| 4,590,445 | 5/1986 | Tabourier et al. | 332/18 |
| 4,618,863 | 10/1986 | Collins | 342/192 |
| 4,697,186 | 9/1987 | Rock | 342/189 |
| 4,733,239 | 3/1988 | Schmitt | 342/94 |
| 4,739,331 | 4/1988 | Pincoffs et al. | 342/175 |
| 4,754,277 | 6/1988 | Voyce | 342/83 |
| 4,757,265 | 7/1988 | Peacher | 342/17 |
| 4,800,388 | 1/1989 | Okada | 342/194 |
| 4,813,006 | 3/1989 | Burns et al. | 342/189 X |
| 4,894,660 | 1/1990 | Thomson et al. | 342/129 |
| 4,937,583 | 6/1990 | Poinsard | 342/195 |
| 5,021,791 | 6/1991 | Hurd | 342/93 |

*Primary Examiner*—John B. Sotomayor
*Attorney, Agent, or Firm*—Richard M. Sharkansky

[57] ABSTRACT

Apparatus for detecting FM signals, such as from a radio altimeter, is disclosed. The apparatus contains a phase detector which has as inputs the received signal and a delayed replica of the input signal. The output of the phase detector is filtered in a filter bank, the outputs of which feed a logic circuit. The logic circuit selects the output with the largest signal level. If the selected output has a level exceeding a threshold, the presence of an FM signal is indicated.

8 Claims, 2 Drawing Sheets

CORRELATION DETECTOR FOR FM SIGNALS

This application is a continuation of U.S. Pat. application Ser. No. 516,501 filed Apr. 30, 1990 now abandoned.

BACKGROUND OF THE INVENTION

This application relates generally to detecting frequency modulated (FM) signals and more particularly to detecting signals from FM altimeters and radars.

FM signals are well suited for measuring the distance from a transmitter to an object from which the FM signal reflects. Signals in which the frequency increases or decreases linearly ("chirped signals") are particularly well suited for these functions. For this reason, FM signals are sometimes used in altimeters on aircraft. Also, FM signals are used in radars which are often on aircraft or other moving bodies.

It is sometimes desirable to determine when an aircraft is in the vicinity. For example, in a battlefield scenario, it can be very important to detect all aircraft in the area. The FM signals emitted by altimeters or radars on aircraft can indicate the presence of the aircraft.

However, a problem results when FM altimeter or FM radar signals are used to detect aircraft. These signals are generally very directive and are not always directed at the device trying to detect the aircraft. For example, an altimeter signal is transmitted directly at the ground below the aircraft. A device trying to detect the aircraft would receive only the side lobes of the FM signal. Thus, the received FM signal would be at a relatively low level.

Detecting relatively low level signals, especially in noisy environments, can be difficult and requires a high sensitivity receiver. Existing systems use what is called a "walk-through receiver" to detect FM signals. The walk-through receiver contains a relatively narrow bandpass filter. As the FM signal changes in frequency, its frequency will, for some period of time, fall in the passband of the filter. The output of the filter will be a pulse having a non-zero value when the FM signal has a frequency in the passband of the filter. Ordinary pulse detection techniques are applied to the output of the filter to detect the pulses which signify the presence of an FM signal.

The walk-through receiver has a drawback in that only a portion of the energy in the FM signal appears in the output pulse. In effect, the signal level is attenuated. This attenuation reduces the sensitivity of the receiver and makes detection of an FM signal less likely.

SUMMARY OF THE INVENTION

With the foregoing background in mind, it is an object of this invention to provide a higher receiver sensitivity to detect FM signals.

It is also an object of this invention to provide a receiver for detecting aircraft by identifying signals from FM altimeters.

The foregoing and other objects are accomplished in a receiver where the received signal is split into two channels. The first channel contains a delay element. Both channels are fed to a phase detector, the output of which is fed to a filter bank. The outputs of all the filters in the filter bank are fed to a logic circuit which selects the filter output with the largest signal level and passes that output to a threshold circuit. If the signal level exceeds a predetermined threshold, the threshold circuit signals the detection of an FM signal.

BRIEF DESCRIPTION OF THE DRAWINGS

The invention may be better understood by reference to the following more detailed description and accompanying drawings in which.

DESCRIPTION OF THE PREFERRED EMBODIMENTS

Figure 1:
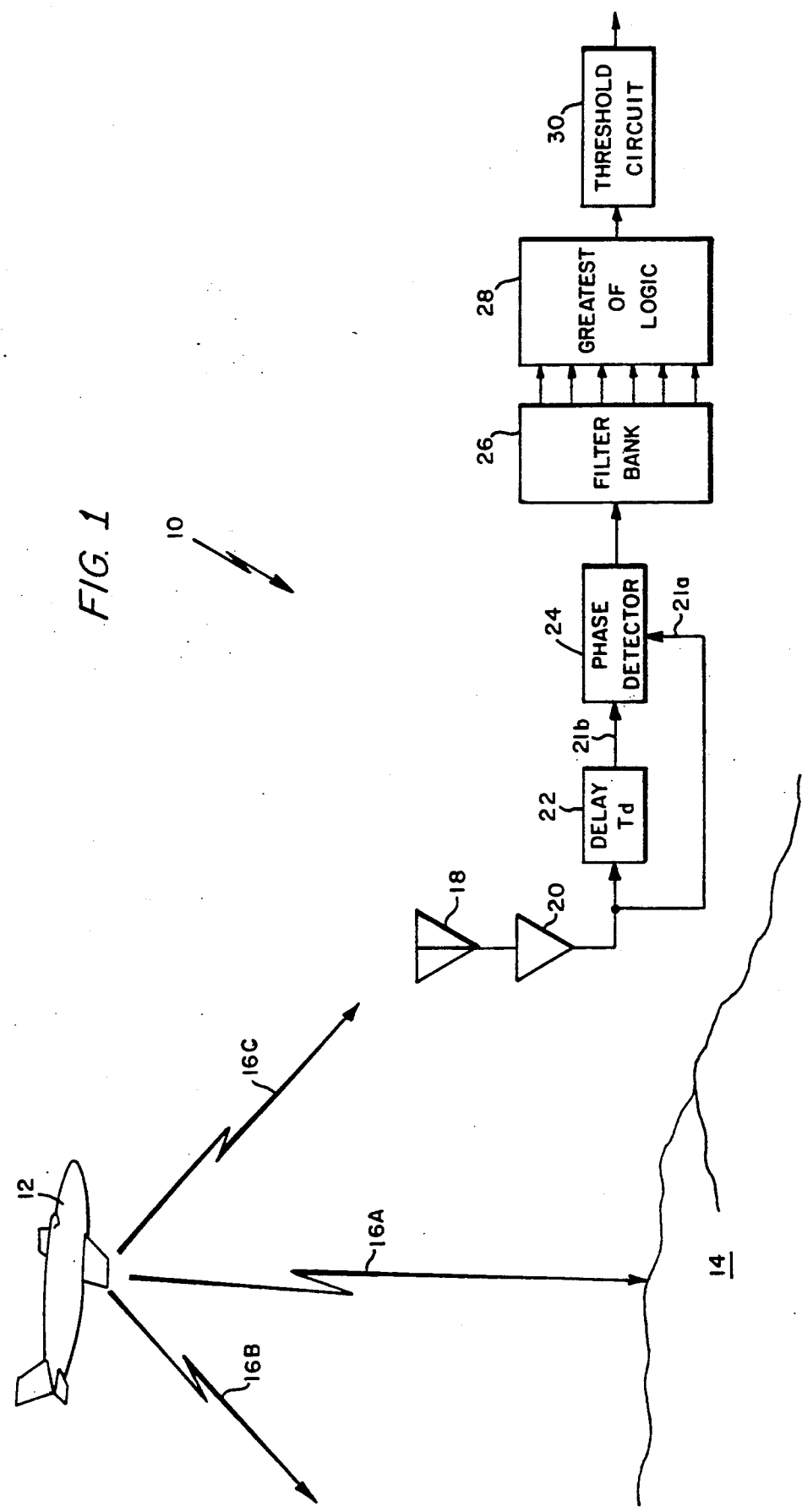
FIG. 1 shows a block diagram of a receiver fabricated according to the invention.

FIG. 1 shows a block diagram of a receiver 10 designed to detect the presence of an aircraft 12. Aircraft 12 contains a radio altimeter (not shown) which operates by transmitting a signal 16A towards the ground 14. Signal 16A reflects from the ground and the altimeter determines the height of aircraft 12 above ground 14 by measuring the back and forth propagation delay of signal 16A.

Most known radio altimeters use FM signals for signal 16A. In particular, chirped signals are used. Thus, receiver 10 detects the presence of aircraft 10 by detecting the presence of a chirped signal.

As shown in FIG. 1, signal 16A is directed from aircraft 12 to ground 14. Signal 16A is not necessarily received by receiver 10. However, the altimeter (not shown) on aircraft 12 invariably transmits sidelobe signals such as signals 16b and 16c. At least a portion of sidelobe signals 16b and 16c will be received by receiver 10 when aircraft 12 is sufficiently close to receiver 10. Thus, receiver 10 will most likely detect the sidelobe signals 16b or 16c.

Sidelobe signal 16c impinges on antenna 18 of receiver 10. Here, antenna 18 is some antenna of known construction. Preferably, antenna 18 has a beam pattern with broad angular coverage. The received signal is amplified by amplifier 20. Amplifier 20 is of known construction.

The amplified signal is split into two paths. One path runs directly to input 21a of phase detector 24. The second path runs to input 21b of phase detector 24 through delay element 22. Delay element 22 is any substantially non-dispersive delay element of known construction. Delay element 22 delays the signal by an amount $T_d$.

Figure 2A:
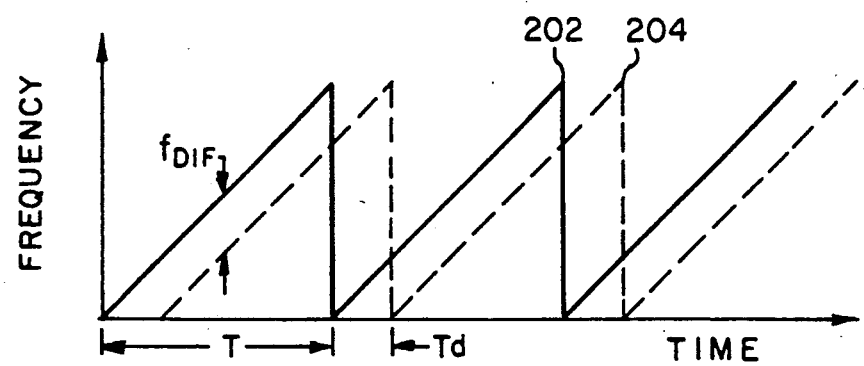
FIG. 2A shows a frequency versus time plot of the inputs to the phase detector of the circuit in FIG. 1.

The signals at inputs 21a and 21b are shown in FIG. 2A. FIG. 2A shows a received waveform 202. Waveform 202 sweeps from a frequency $f_{min}$ to $f_{max}$ in T seconds. These frequency sweeps are repeated at regular intervals. The type of signal received will dictate the numeric values of the parameters of signal 202. The operating characteristics of the circuit elements in FIG. 1 are selected accordingly. For example, if T had a value of 10 ms and the difference between $f_{max}$ and $f_{min}$ were 100 MHz, a value of 60 ns would be an appropriate value of $T_d$. In general $T_d$ is selected to be approximately as given by Eq. 1:

$$T_d = \frac{1}{2} \frac{1}{(f_{max} - f_{min})} \qquad \text{Eq. 1}$$

Signal 202 is applied to input 21a of phase detector 24. Signal 204 is a replica of signal 202, but delayed by an amount $T_d$. Signal 204 is fed to input 21b of phase detector 24.

Phase detector 24 is a phase detector of known construction. Phase detector 24 may also be thought of as a mixer. The output of phase detector 24 is a signal with a frequency equal to the difference between the signals at inputs 21a and 21b.

Figure 2B:
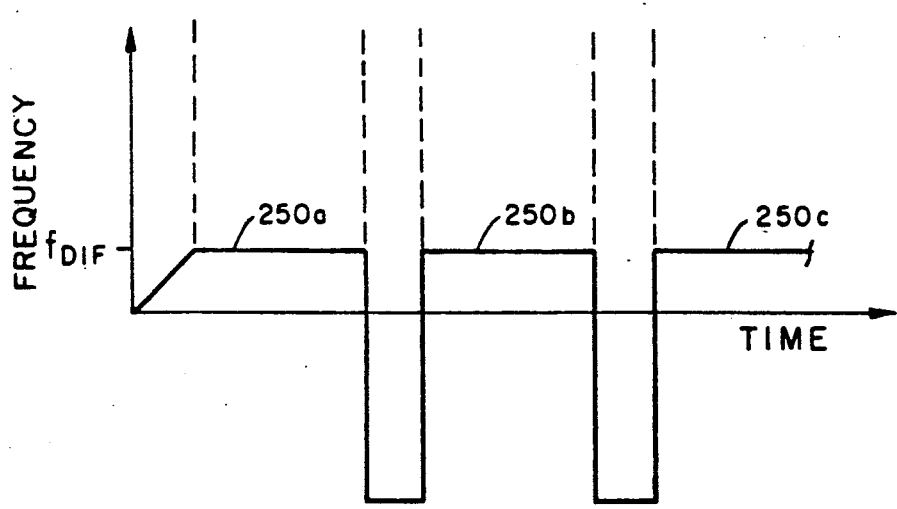
FIG. 2B shows a frequency versus time plot of the output of the phase detector in FIG. 1.

FIG. 2B shows the output of phase detector 24 for input signals 202 and 204. As seen in FIG. 2B, the major portion of the output of phase detector 24 consists of segments 250a, 250b, 250c . . . which are of constant frequency $f_{DIF}$.

The output of phase detector 24 is fed to filter bank 26. Filter bank 26 is here an FFT processor and an analog to digital converter of known construction. The filtering properties of FFT processors are well known. However, other techniques for fabricating filter bank 26 could be employed.

Filter bank 26 has a plurality of outputs. Each output represents the cumulative strength of signals in a particular frequency band averaged over some time window (called the "integration time of the FFT") The signal of FIG. 2B will produce an output in the band containing the frequency $f_{DIF}$. The output signal from phase detector 24 will also produce signals on outputs of filter bank 26 corresponding to other frequency bands. However, these other signals will be at a lower average level because the signal of FIG. 2B has those frequencies for much shorter periods of time.

The outputs of filter bank 26 are fed to logic circuit 28 which selects the output with the largest magnitude. With filter bank 26 implemented with an FFT processor, the outputs of filter bank 26 will be digital words. Thus, logic circuit 28 can be constructed using conventional digital logic circuit design techniques.

The output of logic circuit 28 indicates the level of the largest output of filter bank 26. This level is provided to threshold circuit 30. If the level of the largest signal exceeds a predetermined threshold, threshold circuit 30 produces an output indicating a chirped signal has been detected. This output may be used by some utilization device (not shown) which may interpret the output as indicating the presence of an aircraft.

Having described one embodiment of the invention, it will be apparent to one of skill in the art that various modifications can be made without departing from the invention.

For example, the threshold used by threshold circuit 30 could be set adaptively. In other words, the threshold could be increased if many RF signals and noise are detected Conversely, if the RF environment is relatively free of noise and other signals, the threshold can be lowered.

As another modification, logic circuit 28 could be modified to sequentially pass to threshold circuit 30 several of the largest signals from filter bank 26. If several aircraft are present, several signals might exceed the threshold set by threshold circuit 30 and the OUTPUT could indicate the presence of several aircraft.

The disclosed system could also be modified to provide more information about the detected chirped signal. As shown in FIG. 2B, signal 202 of FIG. 2A produces a signal out of phase detector 24 with mainly a frequency $f_{DIF}$. A little thought will reveal that $f_{DIF}$ is the increase in frequency of signal 202 in time $T_d$. The value of $f_{DIF}$ thus depends on how fast the frequency of signal 202 is changing (sometimes called the "chirp slope"). Certain radio altimeters or FM radios will use different chirp slopes and thus produce different values of $f_{DIF}$. By determining in which frequency band the largest signal falls, the chirp slope of the signal can be determined. Knowing the chirp slope of the signal which produced an OUTPUT signal may allow some utilization device to identify the source of the chirped signal. Along the same lines, logic circuit 28 could be modified so that the largest signal was selected from one of a few selected frequency bands corresponding to chirp slopes of interest.

It is felt, therefore, that this invention should be limited only by the spirit and scope of the appended claims.

What is claimed is:

1. A circuit for indicating the presence of a source of a radio frequency signal having a time varying frequency, said circuit comprising:
   a) antenna means for receiving a portion of the radio frequency signal produced by said source;
   b) means, for coupling the received radio frequency signal to a pair of outputs through a pair of signal channels, such signal channels providing different time delays to the portion of the received signal coupled therethrough, such pair of outputs producing signals having, during a common time interval, different frequencies;
   c) means, coupled to the pair of outputs, for mixing the signals produced at the pair of outputs to produce an output signal having a frequency component related to the difference in the different frequencies of the signals produced at the pair of outputs; and
   d) means, comprising a frequency spectrum analyzer, coupled to the output of the mixing means, for determining a plurality of frequency components of the output signal to detect the presence of the source of the radio frequency signal.

2. The circuit of claim 1 wherein the coupling means comprises:
   a delay line disposed between the antenna means and one of the pair of outputs of the coupling means.

3. The circuit of claim 2 wherein the plurality of frequency components detecting means comprises:
   a) a filter bank, fed by the output of the mixing means, said filter bank having a plurality of outputs, each one of such outputs indicating the level of frequency components of the signal fed thereto;
   b) logic means coupled to each of the plurality of outputs of the filter bank for selecting the one of the plurality of outputs of the filter bank indicating the highest relative level and for producing an output indicating the level of the selected one of the plurality of outputs; and
   c) thresholding means, coupled to the output of the logic means, for producing an output indicating the presence of the source of the time varying frequency signal when the output of the logic means indicates a level above a predetermined threshold.

4. The circuit of claim 3 wherein the filter bank comprises:
   a) an analog to digital converter; and
   b) an FFT processor coupled to the output of the analog to digital converter.

5. An apparatus for detecting signals from FM altimeters comprising:
   a) an antenna;
   b) a delay element;

c) a phase detector having two inputs, one of said inputs being coupled to the antenna and one of said inputs being coupled to the antenna through the delay element; and d) means, coupled to the output of the phase detector, for producing an output indicating the presence of the signal from an FM altimeter comprising:
  i) a filter bank having an input coupled to the phase detector and a plurality of outputs; and
  ii) logic means, coupled to the outputs of the filter bank, for selecting the output with the largest signal level.

6. The apparatus of claim 5 wherein the means for producing an output additionally comprises thresholding means for producing an output indicating the presence of a signal from an FM altimeter when the selected output exceeds a predetermined threshold.

7. A method of indicating the presence of aircraft comprising the steps of:
  a) receiving a radio frequency signal produced in said aircraft;
  b) coupling the received radio frequency signal to a pair of outputs through a pair of signal channels with different time delays;
  c) mixing signals coupled to the pair of outputs;
  d) selecting from a predetermined set of frequency bands the frequency band in which the mixed signal has frequency components with the greatest magnitude; and
  e) indicating the presence of the aircraft when the magnitude of the frequency components in the selected frequency band exceeds a predetermined threshold.

8. Apparatus comprising:
  a) antenna means for receiving radio frequency energy having a true varying frequency;
  b) means for coupling the received radio frequency energy to a pair of outputs through a pair of signal channels, said channels having means for providing different time delays to produce, at the pair of outputs, a pair of output signals, such output signals being replicas of the received energy with a time delay therebetween;
  c) mixer means, having a pair of inputs coupled to the pair of outputs, for producing an output signal having a frequency component related to the difference in the frequencies of the pair of output signals fed to the mixer means; and
  d) a frequency spectrum analyzer means, responsive to the output signal produced by the mixer means, for detecting a plurality of frequency components over a predetermined band of frequencies of the output signal produced by the mixer means to indicate the presence of the radio frequency energy.

* * * * *